United States Patent

Kurando et al.

[11] Patent Number: 5,832,356
[45] Date of Patent: Nov. 3, 1998

[54] AUTOMATIC PAPER FEEDER WITH A TRAY AND TRAY DRIVER THAT ROTATES THE TRAY BASED UPON OPERATING CONDITIONS OF THE FEEDER

[75] Inventors: Shigeo Kurando; Tadanobu Nakajima; Toru Tanjoh; Kazuhisa Kondo; Toshio Yoshiyama; Jyun Kusakabe, all of Osaka, Japan

[73] Assignee: Mita Industrial Co., Ltd., Osaka, Japan

[21] Appl. No.: 727,339

[22] Filed: Oct. 8, 1996

[30] Foreign Application Priority Data

| Oct. 20, 1995 | [JP] | Japan | 7-273224 |
| Oct. 20, 1995 | [JP] | Japan | 7-273225 |
| Oct. 20, 1995 | [JP] | Japan | 7-273226 |
| Oct. 20, 1995 | [JP] | Japan | 7-273227 |
| Oct. 20, 1995 | [JP] | Japan | 7-273228 |
| Oct. 20, 1995 | [JP] | Japan | 7-273229 |
| Oct. 20, 1995 | [JP] | Japan | 7-273230 |
| Oct. 20, 1995 | [JP] | Japan | 7-273250 |

[51] Int. Cl.$^6$ .................................................. G03G 15/00
[52] U.S. Cl. .......................................... 399/367; 271/145
[58] Field of Search .................................... 399/367, 371, 399/377, 373; 271/162, 145; 355/75

[56] References Cited

U.S. PATENT DOCUMENTS 5,363,184 11/1994 Matsuo et al. .......................... 399/367
5,367,370 11/1994 Yoshida et al. .......................... 399/377

*Primary Examiner*—S. Lee
*Attorney, Agent, or Firm*—Beveridge, DeGrandi, Weilacher & Young, LLP

[57] ABSTRACT

An automatic document feeder 1 automatically operates a tray depending on the operating conditions of the automatic document feeder. The automatic document feeder 1 has a set surface 7 on which originals to be conveyed are to be set. An original receiving tray 11 for receiving discharged originals is provided in the vicinity of an original discharge port 10. A lower end of the original receiving tray 11 is rotatable, and a tray driving device is connected to the back of the original receiving tray 11. The tray driving device rotates and displaces the original receiving tray 11 around the lower end depending on the operating conditions of the automatic document feeder 1. The original receiving tray 11 is raised almost perpendicularly until the originals are set on the set surface 7 (see FIGS. 4A and 4D). When the originals are conveyed, the original receiving tray 11 is rotated to an obliquely laid state (see FIGS. 4B and 4C) in order to receive the paper sheets discharged from the discharge port 10. When the originals are set on the set surface 7, the original receiving tray 11 does not interfere with the setting. Further, the original receiving tray 11 is automatically driven, whereby the automatic document feeder 1 is convenient for use.

17 Claims, 18 Drawing Sheets

F I G. 9
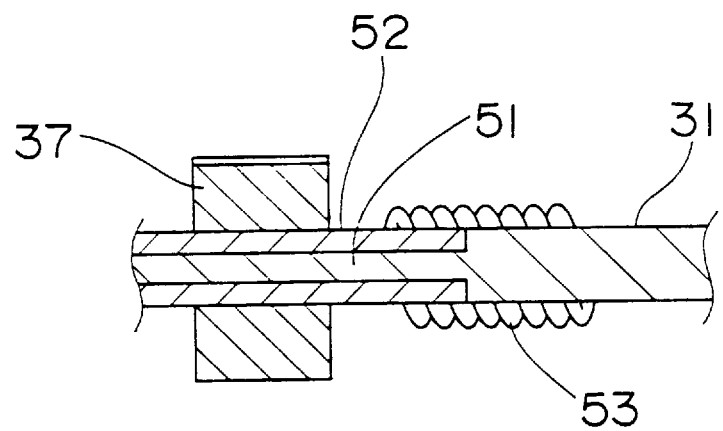

F I G. 13
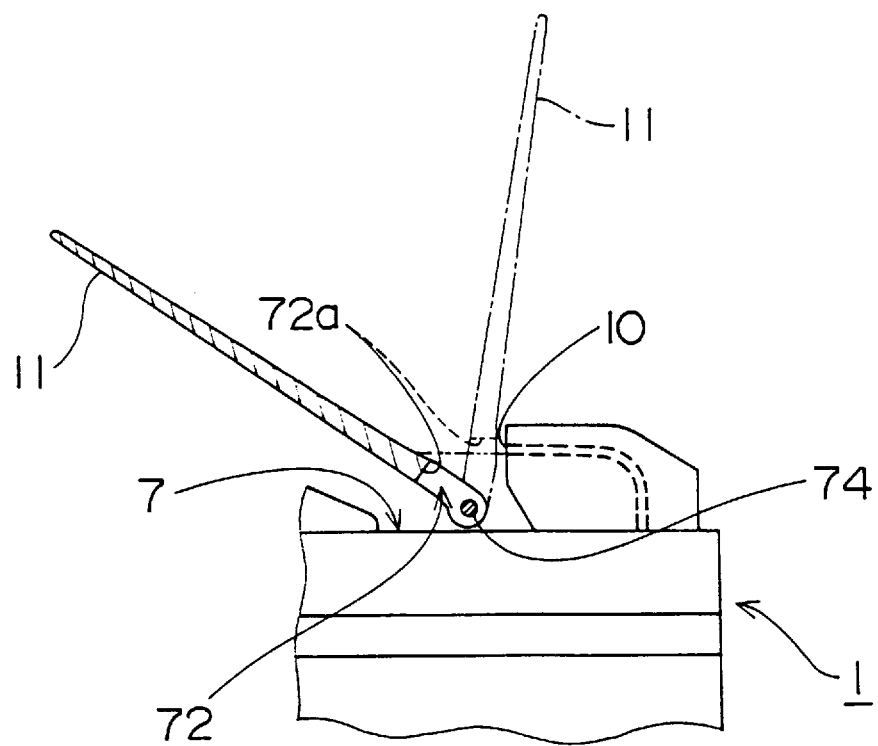

F I G. 14
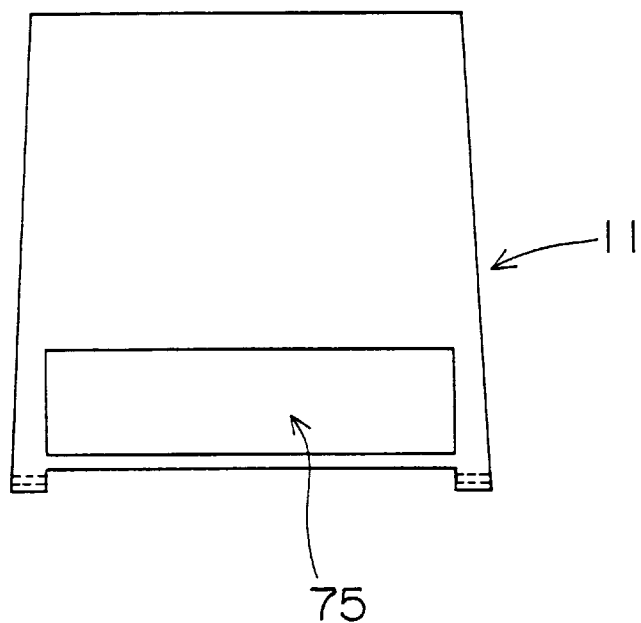

AUTOMATIC PAPER FEEDER WITH A TRAY AND TRAY DRIVER THAT ROTATES THE TRAY BASED UPON OPERATING CONDITIONS OF THE FEEDER

BACKGROUND OF THE INVENTION

1. Field of the Invention

The present invention relates to an automatic paper feeder which can be mounted on an image processing apparatus such as a copying machine, a facsimile, or an original image reader. More particularly, the present invention relates to an automatic document feeder for automatically conveying originals to be read by an image processing apparatus.

2. Description of the Prior Art

A copying machine is taken as an example. An automatic document feeder mounted on the main body of the copying machine has been conventionally known. There exist automatic document feeders of various types and in various shapes. When the automatic document feeder is arranged on the main body of the copying machine, the automatic document feeder has been recently designed so that the width and the depth thereof fall in the ranges of the width and the depth of the main body of the copying machine, that is, it is not projected rightward and leftward or backward or forward from the main body of the copying machine.

FIG. 18 is a schematic diagram showing one example of a conventional automatic document feeder for a copying machine, which is viewed from the front. An automatic document feeder 92 mounted on the upper surface of the main body 91 of the copying machine is caused to have such a shape that the width and the depth thereof fall in the width and the depth of the main body 91 of the copying machine. Therefore, the upper surface in the center of the automatic document feeder 92 is taken as an original set surface 93. Originals set on the original set surface 93 are taken in from an inlet port 94 on the left side, are rotated in the reverse direction through an angle of 180°, and are sent onto an original glass plate 95 provided on the upper surface of the main body 91 of the copying machine. The contents of the originals are read in this state, and copies of the originals are made in the main body 91 of the copying machine. Thereafter, the originals on the original glass plate 95 are moved rightward, are rotated in the reverse direction through an angle of 180°, and are discharged onto a tray 97 from a discharge port 96 on the right side. The tray 97 extends obliquely up to a space above the original set surface 93 with its lower end mounted in the vicinity of a left end of the original set surface 93. By thus arranging the tray 97, the space above the original set surface 93 is effectively utilized, and the tray 97 is not projected outward from the main body 91 of the copying machine.

When an attempt to set originals of large size, for example, A3 size in Japanese Industrial Standard (JIS) (hereinafter referred to as "JIS A3 size") on the original set surface 93 is made, the tray 97 extending to the space above the original set surface 93 interferes with the setting.

In such a case, the originals have been set on the original set surface 93 after the tray 97 is manually raised almost perpendicularly, as indicated by a broken line, so as not to interfere with the setting in the conventional automatic document feeder. Further, the tray 97 is returned to the original oblique state after the originals are set.

When the originals are copied with the tray 97 rising almost perpendicularly, as indicated by the broken line, and the originals which have been copied are discharged from the discharge port 96, the originals which have been copied collide with the tray 97, whereby the originals are jammed, or are damaged. In the conventional automatic document feeder, therefore, a proximity sensor 98 is provided in the vicinity of the discharge port 96, and a magnet 99 is embedded in the tray 97 so that a state where the tray 97 rises almost perpendicularly is sensed and copying processing is not performed in the state.

Furthermore, the automatic document feeder 92 is mounted on the upper surface of the main body 91 of the copying machine so that its front is opened upward centered with respect to its back in order that the originals can be arranged even manually on the original glass plate 95.

In the above-mentioned conventional automatic document feeder, when the tray 97 interferes with the setting of the originals on the original set surface 93, the tray 97 must be manually moved, which is troublesome. When it is not known that the tray 97 is rotatable, it is not known that the tray 97 may be raised, as indicated by a one-dot and dash line, to set the originals on the original set surface 93, whereby the originals are set on the original set surface 93 with difficulty.

Furthermore, even if an attempt to make copies with the tray 97 rising is made, the copies cannot be made, which may, in some cases, be mistaken for a fault in the automatic document feeder 92 by a user who is unaccustomed to operations.

Additionally, when the automatic document feeder 92 is opened toward a space above the main body 91 of the copying machine in an attempt to manually arrange the originals on the original glass plate 95 in a state where the tray 97 in the automatic document feeder 92 is raised almost perpendicularly, the tray 97 is projected toward a space behind the main body 92 of the copying machine. At this time, when the main body 92 of the copying machine is arranged along a wall or the like, the tray 97 collides with the wall behind the main body 92 of the copying machine. Accordingly, the automatic document feeder 92 may not be opened upward. Alternatively, an attempt to forcibly open the automatic document feeder 92 may cause the tray 97 to be damaged.

An automatic paper feeder other than the automatic document feeder for a copying machine also has the same problems.

SUMMARY OF THE INVENTION

A principal object of the present invention is to provide, in an automatic paper feeder comprising a tray for receiving discharged paper sheets, an automatic paper feeder so adapted that a tray is automatically operated depending on the operating conditions of the automatic document feeder, to improve the convenience for use.

Another object of the present invention is to devise, in an automatic paper feeder comprising a tray for receiving discharged paper sheets, the construction of the tray, to improve the convenience for use of the automatic paper feeder.

According to claim 1, a tray is rotated and displaced around its one end by tray driving means. When paper sheets are set on a set surface, therefore, the tray can be moved to the position where it does not interfere with the setting.

Furthermore, when the paper sheets are discharged from a discharge port, the tray can be rotated and displaced to the position where it receives the paper sheets.

According to claim 2, the tray is displaced to a down state and an up state by the tray driving means. In the down state, the tray receives the paper sheets discharged from the discharge port so as to guide the paper sheets obliquely upward. Therefore, the discharged paper sheets can be completely lined up on the tray.

In the up state, the other end of the tray does not exist in a space above the set surface. When the paper sheets are set on the set surface, therefore, the tray does not interfere with the setting, whereby the paper sheets can be easily set.

According to claim 3, the tray is brought into the up state when the automatic paper feeder is in its waiting state, while being brought into the down state when the paper sheets are conveyed. The tray is thus displaced depending on the operating conditions of the automatic paper feeder, whereby the tray need not be manually driven, thereby improving the convenience for use.

According to claim 4, the tray is displaced to the down state and the up state by the tray driving means. In the down state, the tray receives the paper sheets discharged from the discharge port so as to guide the paper sheets obliquely upward. Therefore, the discharged paper sheets are completely lined up on the tray.

In the up state, the other end of the tray does not exist in the space above the set surface. When the paper sheets are set on the set surface, therefore, the tray does not interfere with the setting, whereby the paper sheets can be easily set.

Furthermore, when all the paper sheets are discharged, the tray is swung. It is preferable that the tray in the down state is swung up and down little by little. Consequently, the paper sheets discharged onto the tray slip downward along the tray, whereby the rear ends of the discharged paper sheets are completely lined up.

Additionally, in a case where a sensor for sensing the presence or absence of paper sheets on the tray is arranged on the set surface in the vicinity of the discharge port, when the paper sheets on the tray slip up, the rear ends of the paper sheets on the tray cannot be sensed by the sensor, whereby the paper sheets may be erroneously sensed. The paper sheets on the tray can be caused to slip downward by swinging the tray in the above-mentioned manner, whereby the paper sheets are not erroneously sensed.

When an attempt to automatically convey the paper sheets in the automatic paper feeder is made, paper sheets which are previously used for image processing may, in some cases, be left on a conveying path. Particularly when the paper sheets are previously manually set, for example, the paper sheets may, in some cases, be left.

According to claim 5, when there are paper sheets left, the left paper sheets are sensed and are discharged to the tray from the discharge port by conveying means. At this time, when the tray is in the up state, the paper sheets discharged from the discharge port collide with the tray, whereby the paper sheets may be damaged or jammed. After the tray is driven toward the down state by the tray driving means, to enter a state where it can receive the paper sheets discharged from the discharge port, therefore, the left paper sheets are discharged.

As a result, the left paper sheets are satisfactorily received by the tray automatically driven by the tray driving means.

In a case where the tray is rotated and displaced to the up state and the down state, when the automatic paper feeder enters its opened state when the tray is in the up state, the tray in the up state may collide with an obstacle such as a wall behind the automatic paper feeder.

In claim 6, when it is detected that the automatic paper feeder enters the opened state, the tray is rotated and displaced to the down state by the tray driving means. As a result, the tray is less projected from the set surface of the automatic paper feeder. Even if the automatic paper feeder is brought into the opened state, the tray does not collide with the obstacle such as the wall.

According to claim 7 or 8, when the difference in load of not less than a predetermined value arises between a driving source and the tray, the transmission of a force between the driving source and the tray is rendered null. For example, a driving force from the driving source is rendered null upon being slipped by a slip mechanism. In a state where the tray cannot be displaced upon colliding with the obstacle or the like, therefore, an unreasonable force is not applied to the tray from the tray driving means.

Furthermore, when the tray is manually displaced, a force to displace the tray is not transmitted to the driving source, whereby the driving source is not damaged, for example.

According to claims 9 to 13, in a case where the tray is divided into a main tray and a sub tray, and both the trays are caused to have foldable structures, when an upper end of the tray collides with the obstacle or the like, the sub tray is folded, to prevent the tray from being damaged.

Furthermore, the foldable structures of the main tray and the sub tray are provided with an elastic member for urging the sub tray to a state where the sub tray extends from the main tray, whereby the tray is maintained in an unfolded state when it is used. Consequently, the tray is easy to use.

Additionally, when the tray driving means for automatically driving the tray is provided, the convenience for use of the automatic paper feeder is improved.

According to claims 14 to 16, a paper sensor is provided in relation to the original set surface, whereby the paper sensor becomes easy to wire. The reason is that the paper sensor for sensing the presence or absence of papers on the tray may be generally provided on the tray. If the paper sensor is provided on the tray, however, the wiring of the paper sensor must be performed through a rotating portion of the tray, whereby there are some problems. For example, the wiring becomes complicated, and faults are liable to occur in the wiring.

On the other hand, the paper sensor is provided in relation to the set surface which is a fixed portion, so that the mounting and the wiring of the paper sensor are low in cost, and the reliability of the paper sensor is improved.

Furthermore, the paper sensor is also used as an original size sensor, whereby the number of components is decreased.

Furthermore, if a paper passing section is formed in the tray as set forth in the claim 17, the paper sheets can be discharged even if the tray is in the up state. Such construction is useful for cases such as a case where the tray driving means develops a fault.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 9 is a diagram showing a further example of the construction of the slip driving mechanism;

FIG. 13 is a partially sectional view showing the vicinity of an original discharge port 10 as viewed from the front for explaining the positional relationship between the original discharge port 10 and the original receiving tray shown in FIG. 12;

FIG. 14 is a plan view for explaining the shape and the construction of a further example of the original receiving tray;

DESCRIPTION OF THE PREFERRED EMBODIMENTS

An automatic document feeder for a copying machine will be described in detail by way of example as one embodiment of the present invention. The automatic paper feeder according to the present invention is not limited to the automatic document feeder for a copying machine, and is also applicable to an automatic document feeder for a facsimile, an automatic document feeder for a document reader connected to a computer or the like, an automatic paper feeder for a printer, and the like.

Figure 1:
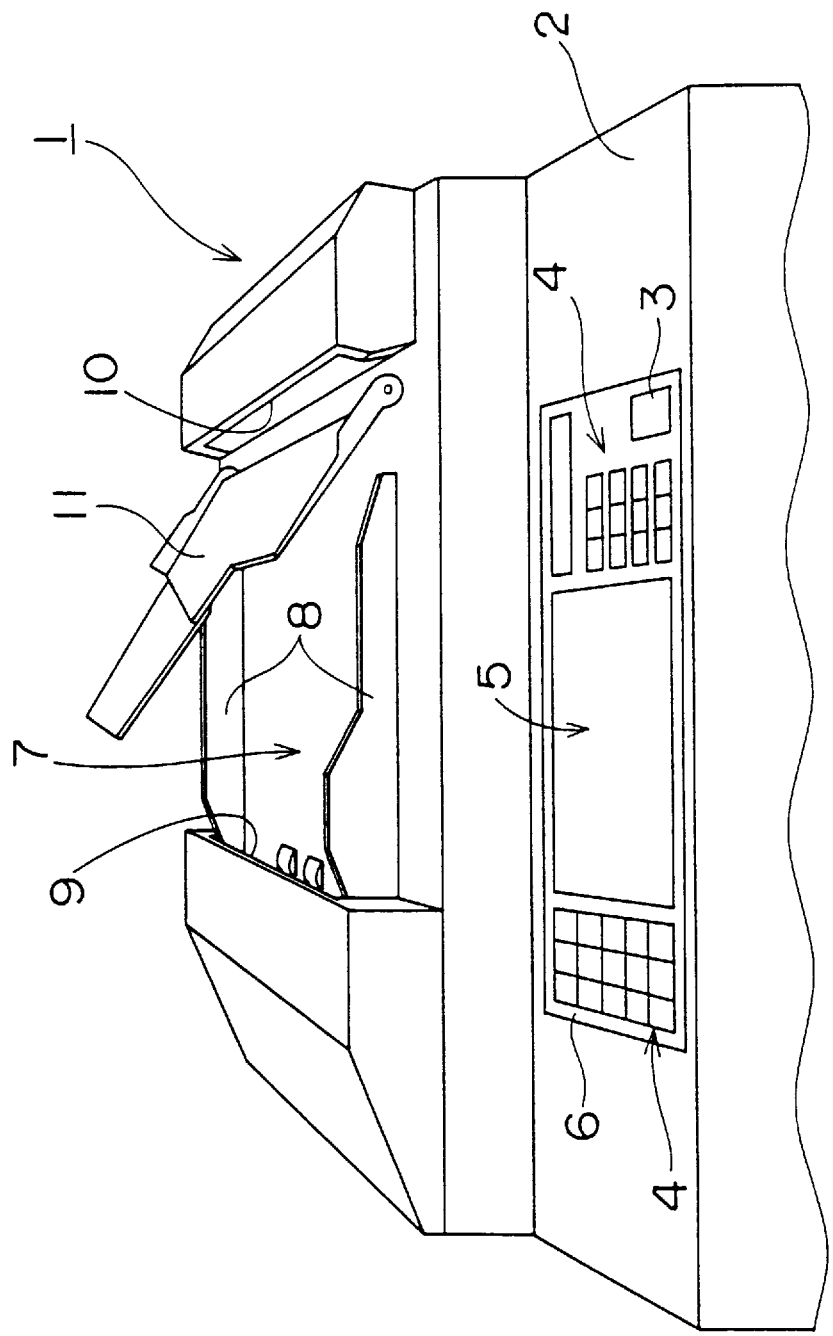
FIG. 1 is a perspective view showing the external construction of an automatic document feeder according to one embodiment of the present invention.
Figure 2:
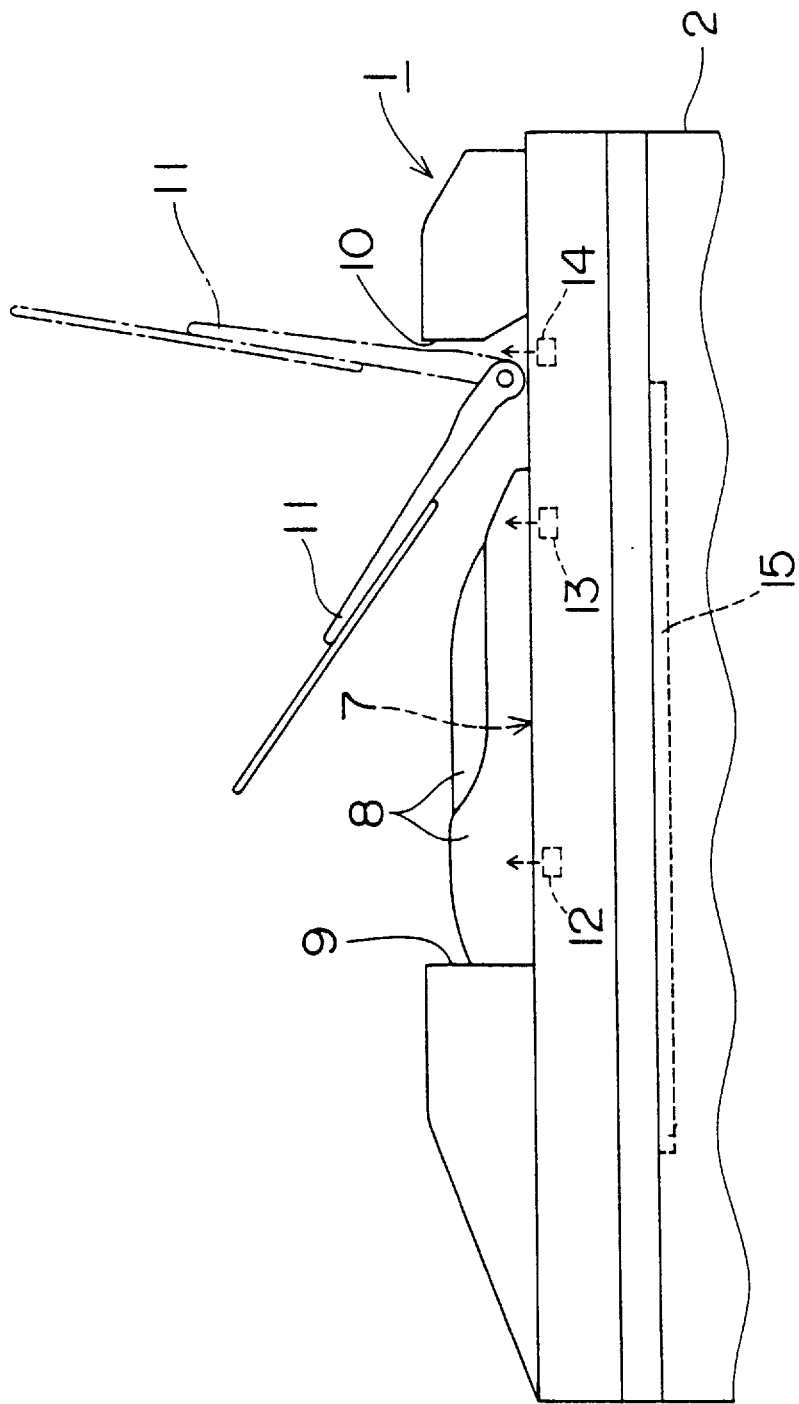
FIG. 2 is a front view showing the automatic document feeder shown in FIG. 1.
Figure 3:
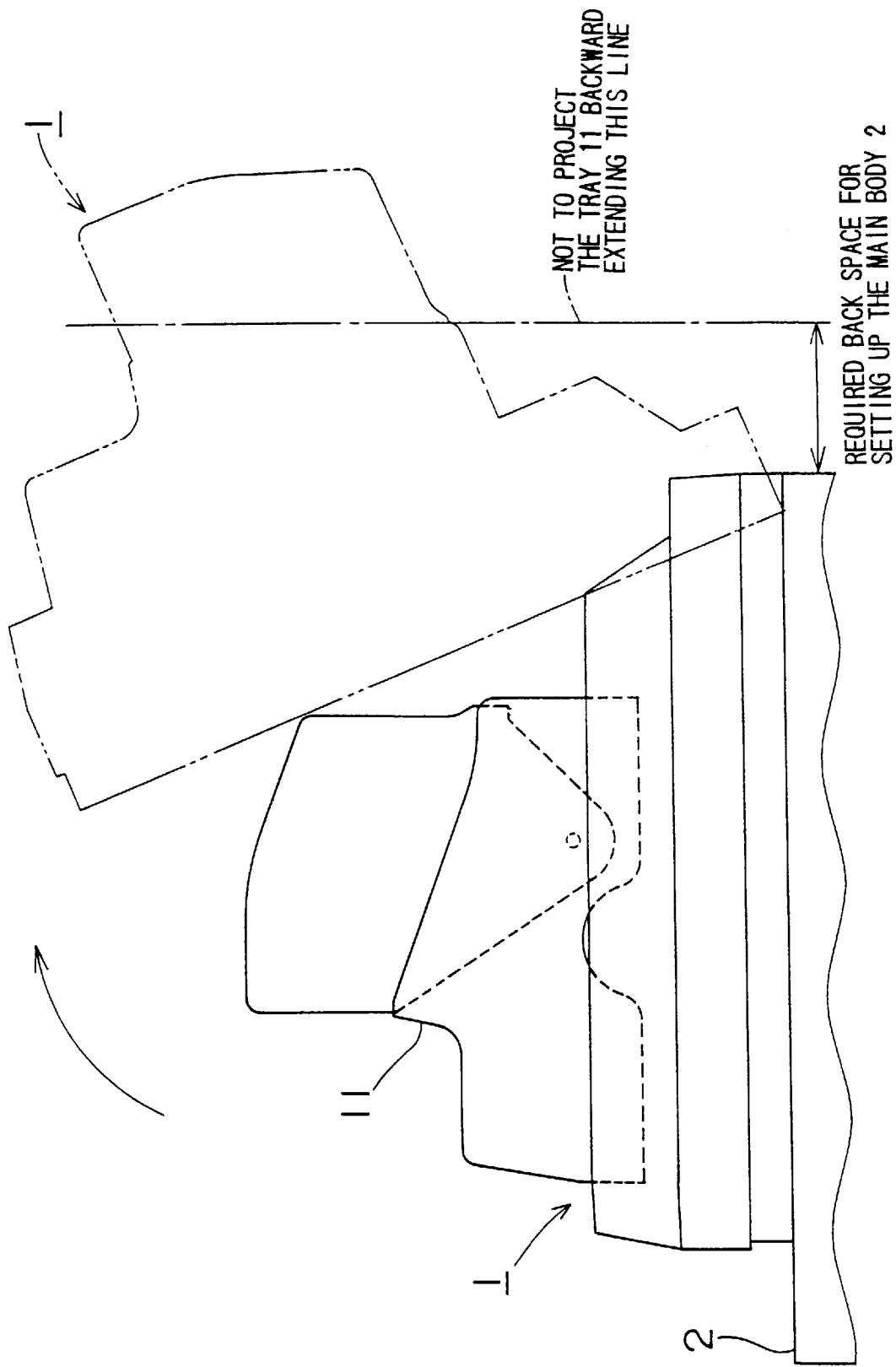
FIG. 3 is a diagram showing the automatic document feeder shown in FIG. 1 as viewed from its right side surface.

FIG. 1 is a perspective view showing the external construction of an automatic document feeder according to one embodiment of the present invention. FIG. 2 is a front view of the automatic document feeder shown in FIG. 1, which illustrates its construction in order to explain sections relating to the embodiment. FIG. 3 is a diagram showing the automatic document feeder shown in FIG. 1 as viewed from its right side surface.

The automatic document feeder 1 is mounted on the upper surface of the main body 2 of a copying machine. An original glass plate 15 (a glass on which originals to be copied are to be arranged) is provided on the upper surface of the main body 2 of the copying machine, and the automatic document feeder 1 also serves as its cover. The automatic document feeder 1 is so adapted that its front is opened upward centered with respect to its back in order that the originals can be arranged even manually on the original glass plate 15 (see a two-dot and dash line in FIG. 3).

An operation panel 6 comprising various groups of operation keys 4 including a copy start key 3 and a display 5 is arranged on the front side on the upper surface of the main body 2 of the copying machine. Operations and the like corresponding to the main body 2 of the copying machine and the automatic document feeder 1 are performed through the operation panel 6.

An original set surface 7 is formed in the center of the upper surface of the automatic document feeder 1. The original set surface 7 is a surface on which the originals to be copied are to be set. A pair of regulating guides for width direction of originals 8 is provided on the front and rear sides on the set surface 7. The regulating guides 8 are moved in synchronism nearer to or away from each other, and are so operated as to conform to the width of the originals set on the original set surface 7.

An original inlet port 9 is formed on the left side of the original set surface 7. An original discharge port 10 is formed on the right side of the original set surface 7. The originals set on the original set surface 7 are taken in one at a time from the original inlet port 9, are arranged on the above-mentioned original glass plate 15 so that images thereon are read, and are discharged from the original discharge port 10. A feed mechanism itself for conveying the originals does not characterize the present invention and is known and hence, the description thereof is omitted.

An original receiving tray 11 is provided in relation to the original discharge port 10. More specifically, the original receiving tray 11 is brought into a so-called cantilever holding state where its lower end is mounted in the vicinity of a right end of the original set surface 7, and the whole thereof extends obliquely up to the left toward a space above the original set surface 7. The originals discharged from the original discharge port 10 are guided toward the original receiving tray 11, and are discharged onto the original receiving tray 11.

The original discharge port 10 is so provided that the originals are discharged toward the original set surface 7, and the original receiving tray 11 is so arranged as to extend obliquely toward the space above the original set surface 7 as described above, whereby the original receiving tray 11 is not projected sideward from the automatic document feeder 1.

In a case where the original receiving tray 11 extends obliquely toward the space above the original set surface 7, however, when the originals are set on the original set surface 7, the original receiving tray 11 may, in some cases, interfere with the setting. Particularly, in cases such as a case where the originals set on the original set surface 7 are originals of the largest size which can be set, for example, originals of JIS A3 size, the originals are difficult to set.

In the present embodiment, the original receiving tray 11 is automatically driven by driving means to a down state where it obliquely falls as indicated by a solid line in FIG. 2 and an up state where it rises almost perpendicularly as indicated by a one-dot and dash line depending on the operating conditions of the automatic document feeder 1.

Furthermore, three sensors 12, 13 and 14, for example, are arranged below the original set surface 7. The sensor 12 is a set original sensor for sensing whether or not there are originals on the original set surface 7. The sensor 13 is an original size sensor for sensing the size of the originals set on the original set surface 7. If the set original sensor 12 senses the originals, and the original size sensor 13 does not sense the originals, it is judged that the size of the set originals is, for example, B5 size in Japanese Industrial Standard (hereinafter referred to as "JIS B5 size") or A4 size in Japanese Industrial Standard (hereinafter referred to as "JIS A4 size"). On the other hand, when both the sensors 12 and 13 sense the originals, it is judged that the size of the set originals is JIS B4 size or JIS A3 size in Japanese Industrial Standard (JIS) (hereinafter referred to respectively as "JIS B4 size" and "JIS A3 size"). In the present embodiment, the number of original size sensors 13 is set to only one. In the above-mentioned case, therefore, the JIS B4 size and the JIS A3 size, for example, cannot be distinguished. If the number of original size sensors is increased, therefore, the size of the originals can be judged more finely.

Furthermore, the sensor 14 is a discharged original sensor for sensing the presence or absence of originals on the original receiving tray 11.

If the discharged original sensor 14 is provided below the original set surface 7, similarly to the set original sensor 12 and the original size sensor 13, the sensor 14 becomes easy to wire.

More specifically, the sensor for sensing the presence or absence of originals on the original receiving tray 11 can be mounted on the original receiving tray 11, for example. However, the original receiving tray 11 is rotated and displaced around its lower end. Therefore, wiring for connecting the discharged original sensor provided in the original receiving tray 11 and a control circuit to which a signal of the sensor is inputted must be performed through a rotating portion for rotating the original receiving tray 11. Therefore, the wiring becomes complicated.

On the other hand, the discharged original sensor 14 is provided in an immovable portion below the original set surface 7, whereby the wiring of the sensor 14 is low in cost, and faults in the wiring of the sensor 14 are reduced, thereby improving the reliability.

The operations of the original receiving tray 11 will be described more specifically with reference to FIGS. 4A to 4D.

Figure 4A:
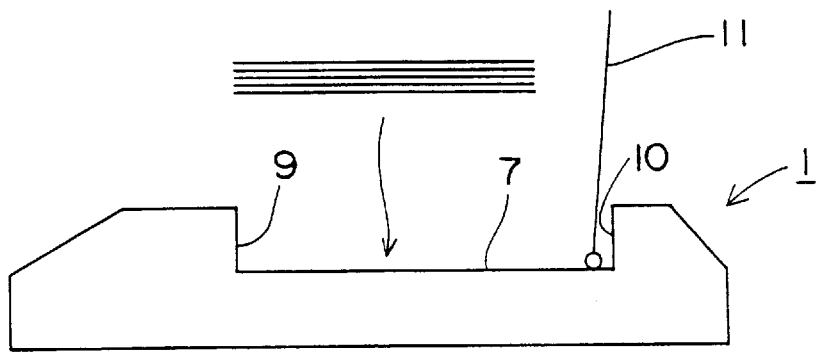
FIGS. 4A to 4D are illustrations for explaining operations of an original receiving tray.

In a state where no originals are set on the original set surface 7, that is, a state where the automatic document feeder 1 waits, the original receiving tray 11 is brought into an up state where it rises almost perpendicularly to the original set surface 7, as shown in FIG. 4A. Therefore, the tray 11 does not exist in the space above the original set surface 7, whereby the originals are easily set on the original set surface 7.

Figure 4B:
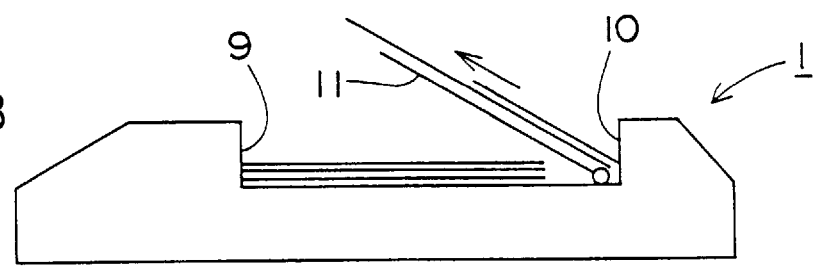

When the copy start key 3 (see FIG. 1) is then depressed after the originals are set on the original set surface 7, the original receiving tray 11 is brought into a down state where it obliquely falls, as shown in FIG. 4B. In this state, the original receiving tray 11 can smoothly introduce the originals discharged from the original discharge port 10, and can receive the discharged originals in line.

Figure 4C:
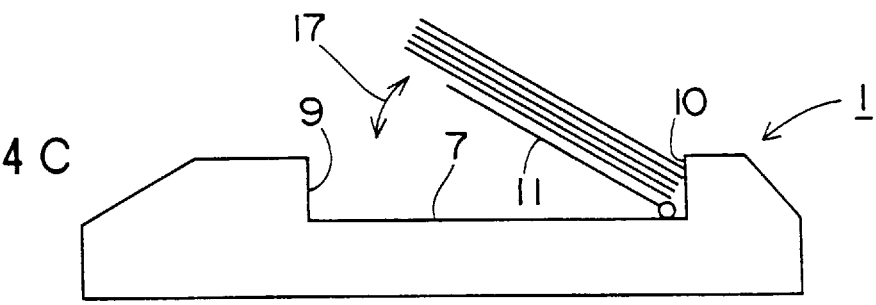

After all the originals have been copied, the original receiving tray 11 is swung up and down little by little, as indicated by an arrow 17, as shown in FIG. 4C. Consequently, it is possible to correct the disorder of the originals on the original receiving tray 11, and completely line up the lower ends of the originals.

Figure 4D:
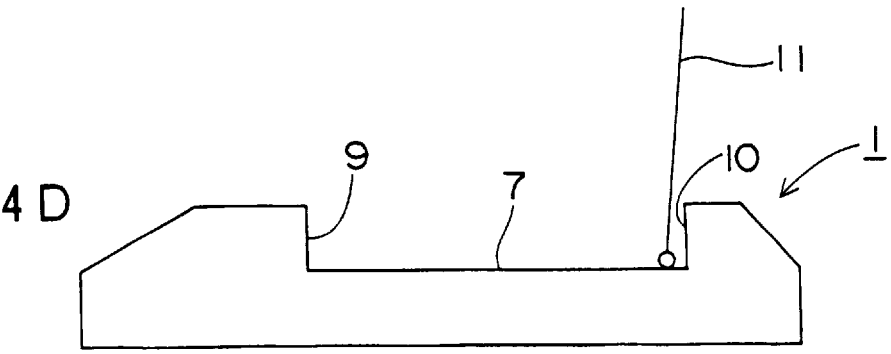

After the copying is terminated, the originals on the original receiving tray 11 are removed. Consequently, the original receiving tray 11 is brought into the up state where it rises perpendicularly to the original set surface 7 again, as shown in FIG. 4D. The automatic document feeder 1 waits for the subsequent copying.

As described in the foregoing, one feature in the present embodiment is that the original receiving tray 11 is driven to the up state and the down state automatically by the driving means depending on the operating conditions of the automatic document feeder 1. Consequently, the original receiving tray 11 does not interfere with the setting of the originals on the original set surface 7, and can satisfactorily guide and receive the originals discharged from the discharge port 10.

Figure 5:
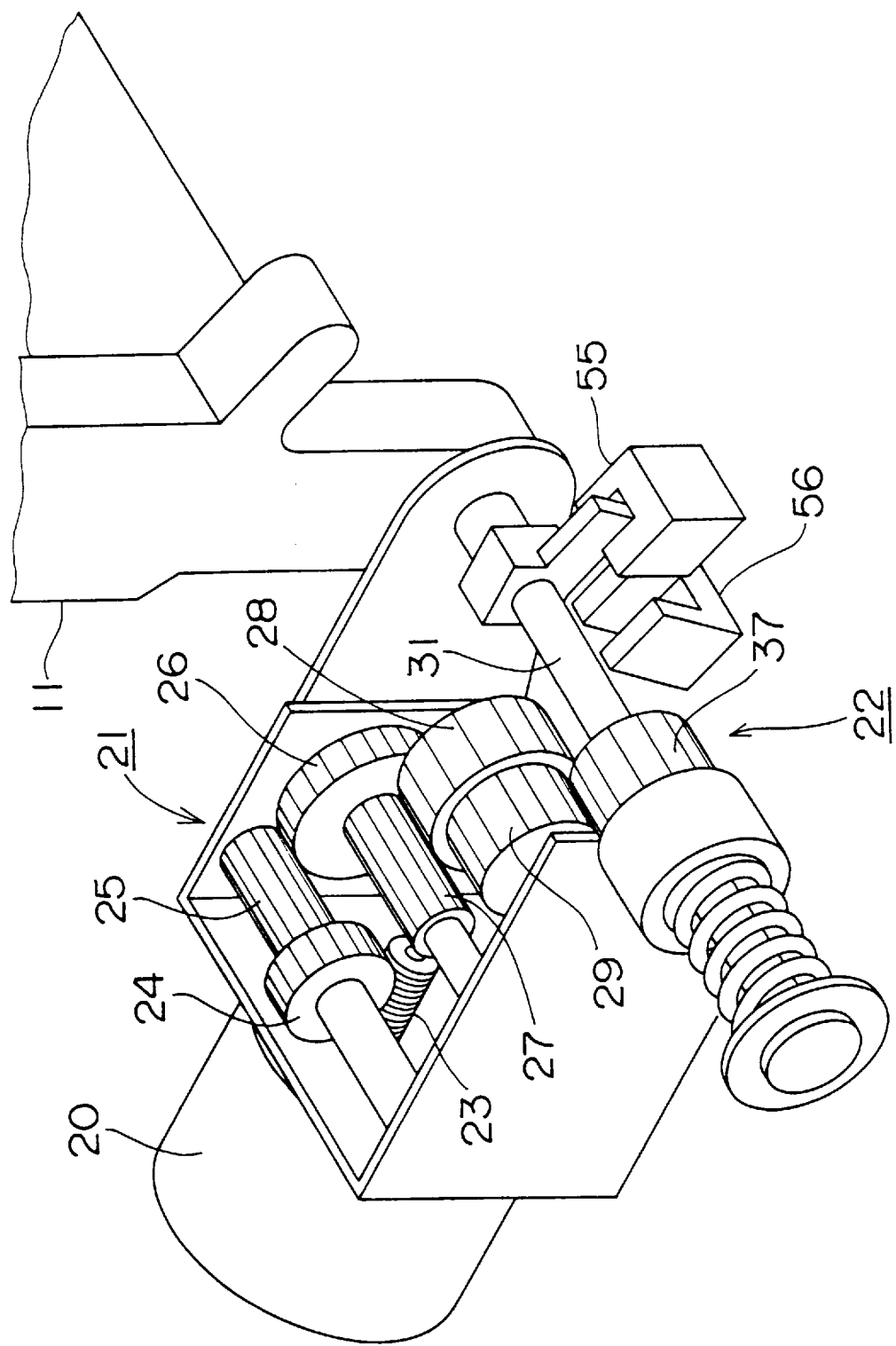
FIG. 5 is a perspective view showing one example of a tray driving mechanism.

FIG. 5 is a perspective view showing one example of the driving means for driving the original receiving tray 11 to the up state and the down state. The driving means for driving the original receiving tray 11 comprises a motor 20, a gear mechanism 21 for transmitting torque produced by the motor 20, and a slip driving mechanism 22 receiving a driving force from the gear mechanism 21, as shown in FIG. 5.

A DC motor, for example, capable of forward rotation and reverse rotation is used as the motor 20. A worm gear 23 is fitted in the axis of rotation of the motor 20. The rotation of the worm gear 23 is transmitted to a first large gear 24, and the rotation of the first large gear 24 rotates a first small gear 25 coaxially connected thereto. The first small gear 25 is engaged with a second large gear 26, and the rotation of the first small gear 25 is transmitted to the second large gear 26. A second small gear 27 is coaxially connected to the second large gear 26, and the rotation of the second large gear 26 is transmitted to the second small gear 27. Further, a third large gear 28 is engaged with the second small gear 27, and an output gear 29 is provided concentrically with the third large gear 28. Accordingly, the rotational speed of the motor 20 is decelerated by the gear mechanism 21 including the above-mentioned gears 23 to 29. The torque produced by the motor 20 is amplified by the gear mechanism 21, and is transmitted to the slip driving mechanism 22.

The slip driving mechanism 22 comprises an input gear 37 receiving the driving force from the gear mechanism 21, a slip mechanism as described later, and a driving shaft 31, and the original receiving tray 11 is driven by the driving shaft 31. Further, a tray up sensor 55 and a tray down sensor 56 for sensing the state of the original receiving tray 11 are provided in relation to the driving shaft 31.

Figure 6:
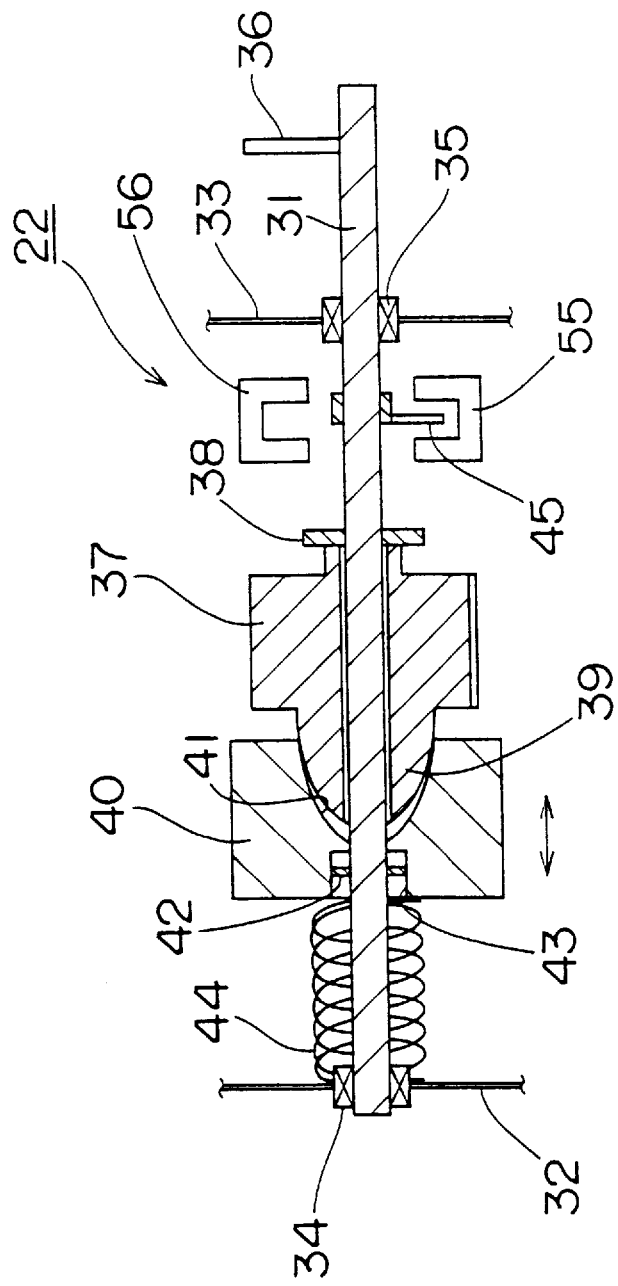
FIG. 6 is a diagram showing one example of the construction of a slip driving mechanism included in the tray driving mechanism.

FIG. 6 is a diagram showing the construction of the slip driving mechanism 22 provided in the present embodiment. The driving shaft 31 is provided in the slip driving mechanism 22. The driving shaft 31 is supported by a pair of supporting members 32 and 33. Specifically, one end (a left end) of the driving shaft 31 is rotatably supported by a bearing 34 mounted on the supporting member 32. On the other hand, a portion near the other end (a right end) of the driving shaft 31 penetrates through the supporting member 33, and a penetrating portion is rotatably supported by a bearing 35 fixed to the supporting member 33. The driving shaft 31 is so supported as not to be slidably displaceable in the direction of the length of the shaft with respect to the supporting members 32 and 33.

A tray mounting projection 36 for mounting the original receiving tray 11 is provided on the side of the right end of the driving shaft 31. When the driving shaft 31 is rotated, therefore, the original receiving tray 11 (not shown) mounted on the tray mounting projection 36 is driven, as described above.

The input gear 37 is externally fitted in the driving shaft 31. The input gear 37 is engaged with the output gear 29 in the above-mentioned gear mechanism 21 (see FIG. 5). The input gear 37 is rotatably mounted on the driving shaft 31. Even if the input gear 37 is rotated by the output gear 29, therefore, torque produced by the input gear 37 is not directly transmitted to the driving shaft 31. A positioning projection 38 is provided opposite to the side of one end, that is, the right side in FIG. 6 of the input gear 37. The positioning projection 38 is a pin or washer fastened to the driving shaft 31. The input gear 37 has its right end received by the positioning projection 38, whereby the input gear 37 cannot be slidably moved rightward along the driving shaft 31.

A rounded conical projection 39 formed integrally with the input gear 37 and projected toward the axis of the input gear 37 is provided on the side of the other end, that is, the left side of the input gear 37.

On the other hand, a driving force receiving member 40 which is engaged with the conical projection 39 is mounted on the driving shaft 31. The driving force receiving member 40 comprises a receiving recess 41 which can receive the conical projection 39 on the opposite side of the conical projection 39. The driving force receiving member 40 is so mounted as to be rotated integrally with the driving shaft 31, and is slidable in the direction of the length of the driving shaft 31. Specifically, a pin 42 is projected from the driving shaft 31, and a notch 43 which is engaged with the pin 42 is formed in the driving force receiving member 40. The notch 43 is made long toward the length of the driving shaft 31, and is so made wide that the pin 42 is fitted therein along the peripheral surface of the driving shaft 31.

Furthermore, a coil spring 44 which is externally fitted in the driving shaft 31 in a free state is fitted between a left end surface of the driving force receiving member 40 and the supporting member 32. The coil spring 44 always presses the driving force receiving member 40 rightward, and engages the receiving recess 41 and the conical projection 39 with each other by a predetermined frictional force.

The slip driving mechanism 22 is constructed as described above. When the input gear 37 is rotated, therefore, the torque produced by the input gear 37 is transmitted to the driving force receiving member 40 from the conical projection 39 through the receiving recess 41 in the normal state. If the driving force receiving member 40 is rotated, the driving shaft 31 is also rotated. Consequently, the original receiving tray 11 is driven.

On the other hand, when an attempt to manually drive the original receiving tray 11 is made, and the original receiving tray 11 is not moved upon colliding with something, a portion between the conical projection 39 and the receiving recess 41 slips, whereby the torque produced by the input gear 37 is not -transmitted to the driving force receiving member 40. It can be determined by the materials of both the conical projection 39 and the receiving recess 41 and the tension of the coil spring 44 what degree of force should be applied to the original receiving tray 11 when the portion between the conical projection 39 and the receiving recess 41 slips.

When the original receiving tray 11 is driven by the motor 20, there are the following merits by interposing the above-mentioned slip driving mechanism 22 in a driving force transmitting path.

When a user first nipped his or her fingers, for example, in the original receiving tray 11 to be driven, the original receiving tray 11 is not forcibly driven, whereby torque to drive the original receiving tray 11 is idled by the slip driving mechanism 22. Even if the user nips his or her fingers, for example, in the original receiving tray 11, therefore, the user is not injured, for example.

When the user does not understand that the original receiving tray 11 is automatically driven, the user may, in some cases, manually bring the original receiving tray 11 into the down state or the up state. In such a case, the driving shaft 31 is rotated by moving the original receiving tray 11. However, torque produced by the driving shaft 31 is idled by the slip driving mechanism 22, not to be transmitted to the gear mechanism 21 and the motor 20 from the input gear 37. Therefore, the gear mechanism 21 and the like may not be damaged.

Furthermore, even if the motor 20 and the gear mechanism 21 develop faults, the original receiving tray 11 can be manually driven. Even when the driving means for driving the original receiving tray 11 develops a fault, therefore, the automatic document feeder 1 itself can be used without being interfered with by the fault.

A shielding plate 45 is further fixed to the driving shaft 31. A tray up sensor 55 and a tray down sensor 56 are arranged in the vicinity of the shielding plate 45. When the driving shaft 31 is rotated, the shielding plate 45 is moved, to be changeable to a state where it crosses the tray up sensor 55 and the tray down sensor 56 and a state where it does not cross the tray up sensor 55 and the tray down sensor 56. The tray up sensor 55 and the tray down sensor 56 output signals indicating whether the original receiving tray 11 is in the up state or the down state on the basis of the position of the shielding plate 45.

Figure 7:
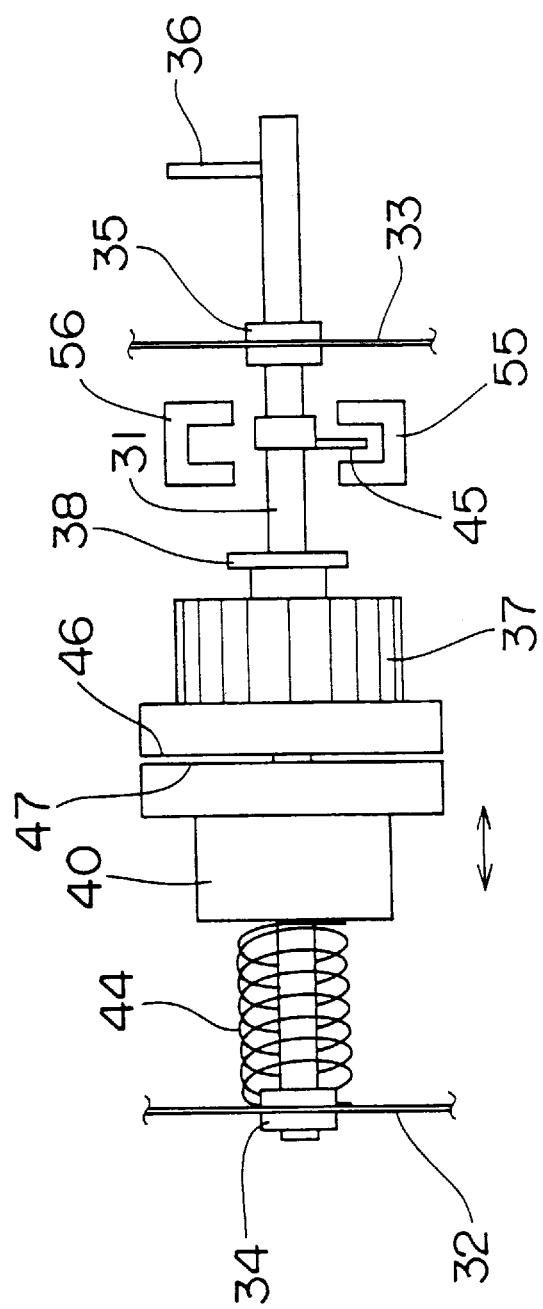
FIG. 7 is a diagram showing another example of the construction of the slip driving mechanism.
Figure 8:
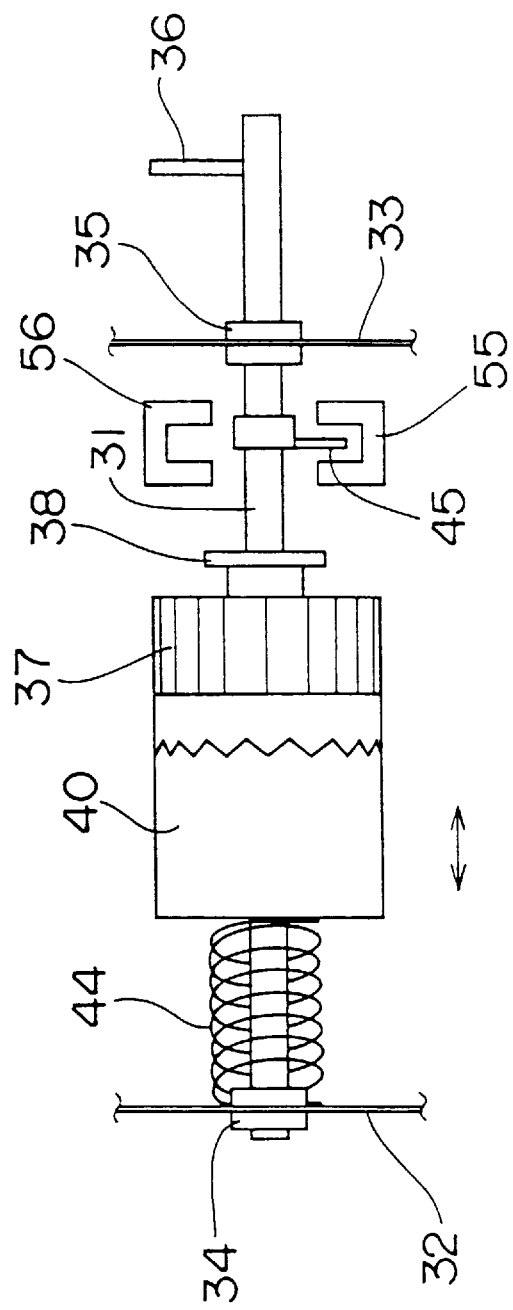
FIG. 8 is a diagram showing still another example of the construction of the slip driving mechanism.

FIGS. 7, 8 and 9 are diagrams showing another example of the above-mentioned slip driving mechanism. The slip driving mechanism 22 shown in FIG. 6 may be replaced with a slip driving mechanism shown in FIG. 7, 8 or 9.

First, the slip driving mechanism shown in FIG. 7 is characterized in that a pair of opposite friction plates 46 and 47 is used in order to transmit a driving force to a driving force receiving member 40 from an input gear 37. Specifically, the input gear 37 comprises the friction plate 46 integrally formed. The friction plate 47 abuts against the friction plate 46. The friction plate 47 is formed integrally with the driving force receiving member 40, and is pressed by a predetermined force toward the friction plate 46 by a coil spring 44. Accordingly, torque produced by the input gear 37 is transmitted to the driving force receiving member 40 by a frictional force between the friction plate 46 and the friction plate 47, whereby a driving shaft 31 is rotated.

The other construction is the same as the construction of the slip driving mechanism 22 shown in FIG. 6, and the same sections are assigned the same reference numerals and hence, the description thereof is not repeated.

The slip driving mechanism shown in FIG. 8 is so adapted that a driving force of an input gear 37 is transmitted to a driving force receiving member 40 by not a frictional force on abutting planes as shown in FIG. 7 but engagement of serrated irregularities formed along its peripheral surface. Even by such construction, a portion between the input gear 37 and the driving force receiving member 40 is idled when the driving shaft 31 enters a state where it is not rotatable upon application of a large load of not less than a predetermined value to an original receiving tray 11, that is, the driving shaft 31.

The other construction is the same as the construction shown in FIG. 7, and the same sections are assigned the same reference numerals and hence, the description thereof is not repeated.

The slip driving mechanism shown in FIG. 9 is of simpler construction than the construction of each of the above-mentioned mechanisms. Referring to FIG. 9, a part of a driving shaft 31 is a thin shaft portion 51 having a small diameter. An input shaft 52 is externally fitted in the thin shaft portion 51. The input shaft 52 is arranged concentrically with the driving shaft 31, and is rotatable with respect to the thin shaft portion 51. An input gear 37 is fitted in the input shaft 52, and the input gear 37 is fastened to the input shaft 52. A lapping coil 53 is externally fitted in the input shaft 52 and the driving shaft 31 so as to stretch over both the shafts. The lapping coil 53 is wound around the outer peripheries of the input shaft 52 and the driving shaft 31, and holds both the shafts by its spring force.

By such construction, when the input gear 37 is rotated, the input shaft 52 is rotated in the normal state, and torque produced by the input shaft 52 is transmitted to the driving shaft 31 through the lapping coil 53. If a load of not less than a predetermined value is applied to the driving shaft 31, a slip occurs between the driving shaft 31 and the lapping coil 53 or between the input shaft 52 and the lapping coil 53. Even if the input gear 37 continues to be rotated, therefore, the driving shaft 31 is not rotated.

Figure 10:
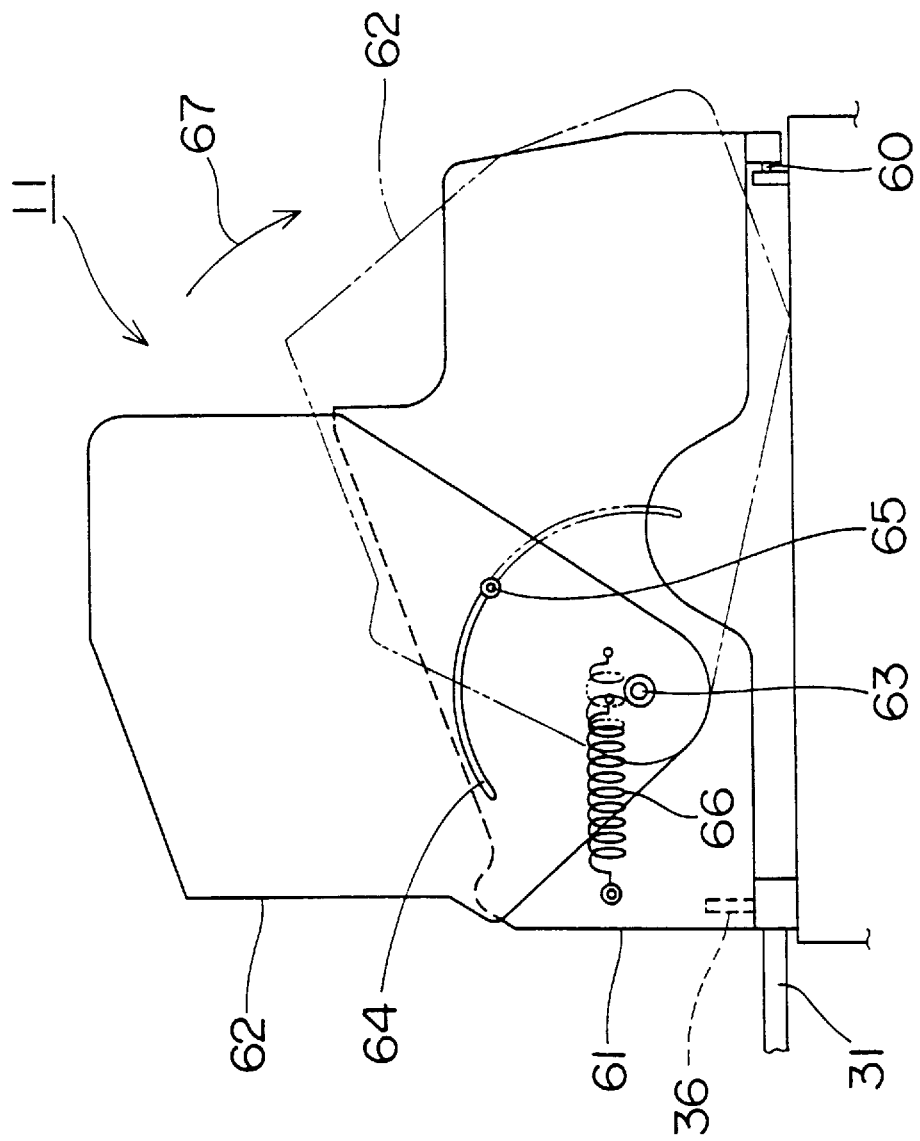
FIG. 10 is a diagram for explaining one example of the shape and the construction of an original receiving tray.

FIG. 10 is a diagram for explaining the shape and the construction of the original receiving tray 11. In FIG. 10, the original receiving tray 11 as viewed in a direction opposite to the direction shown in FIG. 3 is illustrated. Referring to FIG. 10, the original receiving tray 11 comprises a main tray 61 and a sub tray 62 slidably connected to the main tray 61. The main tray 61 has its one lower end connected to the mounting projection 36 of the above-mentioned driving shaft 31 (see FIG. 6). On the other hand, the other lower end of the main tray 61 is rotatably held by a pin 60, for example, provided on the original set surface 7.

The sub tray 62 is connected to the main tray 61 by a supporting shaft 63. The sub tray 62 is rotatable around the supporting shaft 63 with respect to the main tray 61. A guide groove 64 and a guide pin 65 are further provided between the main tray 61 and the sub tray 62. The guide groove 64 is formed in the sub tray 62, and is in the shape of a circular arc centered around the supporting shaft 63. The guide pin 65 is projected from the main tray 61, and is engaged with the guide groove 64 in the sub tray 62. Therefore, the sub tray 62 can be swung within the range of the guide groove 64 around the supporting shaft 63.

Although in this example, the guide pin 65 and the guide groove 64 are respectively provided in the main tray 61 and the sub tray 62, the guide groove and the guide pin may be respectively provided in the main tray 61 and the sub tray 62.

A spring 66 is further arranged between the main tray 61 and the sub tray 62. One end of the spring 66 is fitted in the main tray 61, and the other end thereof is fitted in the sub tray 62. The spring 66 is for urging the sub tray 62 to an extending state where the sub tray 62 extends with respect to the main tray 61. Accordingly, the sub tray 62 is generally in the extending state indicated by a solid line by the tension of the spring 66. On the other hand, if an external force in a direction indicated by an arrow 67 is applied to the sub tray 62, the sub tray 62 is rotated against the tension of the spring 66. While the external force is applied, the sub tray 62 enters a folded state indicated by a two-dot and dash line.

When the original receiving tray 11 is thus made changeable to the extending state and the folded state, there are the following merits.

As described with reference to FIG. 3, the automatic document feeder 1 also serves as the cover of the original glass plate 15. When the originals are manually set on the original glass plate 15, therefore, the automatic document feeder 1 must be opened, as indicated by a two-dot and dash line in FIG. 3. At this time, the original receiving tray 11 provided in the automatic document feeder 1 is in the up state, whereby the original receiving tray 11 is projected toward a space behind the main body 2 of the copying machine. When there is a wall or the like in the space behind the main body 2 of the copying machine, therefore, the original receiving tray 11 collides with the wall. If the original receiving tray 11 is caused to have the above-mentioned foldable structure, even in a case where an upper end of the original receiving tray 11 collides with the wall or the like behind the main body 2 of the copying machine when the automatic document feeder 1 is opened, the sub tray 62 is rotated without being interfered with by the collision.

In the present embodiment, in addition to causing the original receiving tray 11 to have the above-mentioned foldable structure, the original receiving tray 11 is automatically moved from the up state to the down state by the driving means when the automatic document feeder 1 is opened, as described later. Even if the original receiving tray 11 is not folded, therefore, the original receiving tray 11 does not collide with the wall or the like behind the main body 2 of the copying machine.

As described in the foregoing, the original receiving tray 11 can be divided into at least the main tray 61 and the sub tray 62, and caused to have such a foldable structure that surfaces of the main tray 61 and the sub tray 62 are overlapped or are not overlapped with each other by the rotation of the sub tray 62. Further, the original receiving tray 11 may be a connecting member of the main tray and two or more sub trays. Alternatively, as in a modified example described below, the original receiving tray 11 may be caused to have such a foldable structure that a connecting portion of the main tray 61 and the sub tray 62 can be folded.

Figure 11:
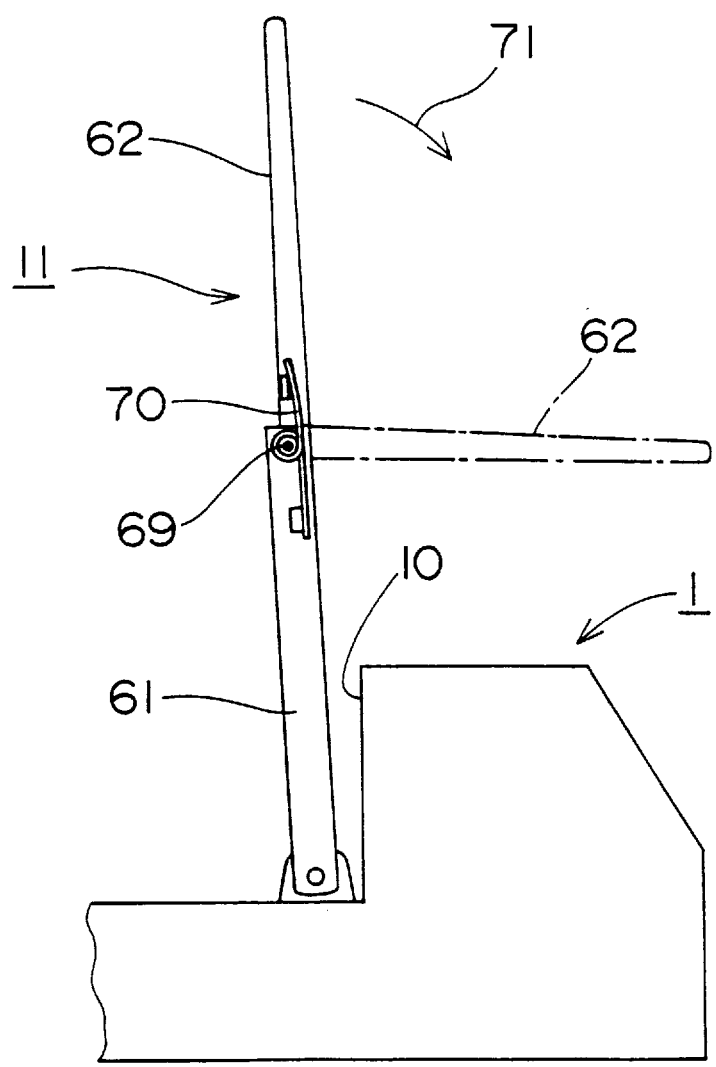
FIG. 11 is a diagram showing another example of the construction of the original receiving tray.

FIG. 11 is a diagram showing an example of another foldable structure of the original receiving tray 11. In FIG. 11, a state where the original receiving tray 11 is viewed from the front of the automatic document feeder 1 is illustrated.

The original receiving tray 11 shown in FIG. 11 comprises a main tray 61 and a sub tray 62. An upper side of the main tray 61 and a lower side of the sub tray 62 are rotatably connected to each other by a hinge pin 69. A helical coil spring 70, for example, is mounted in relation to the hinge pin 69. The helical coil spring 70 urges the main tray 61 and the sub tray 62 to an approximately straight state by its elastic force. Even when a force in a direction indicated by an arrow 71 is applied to the sub tray 62, the sub tray 62 is folded, as indicated by a one-dot and dash line, against the elastic force of the helical coil spring 70.

A connecting structure between the sub tray 62 and the main tray 61 is so devised that the sub tray 62 is not folded leftward from a state indicated by a solid line in FIG. 11.

The original receiving tray 11 may be further constructed as follows.

Figure 12:
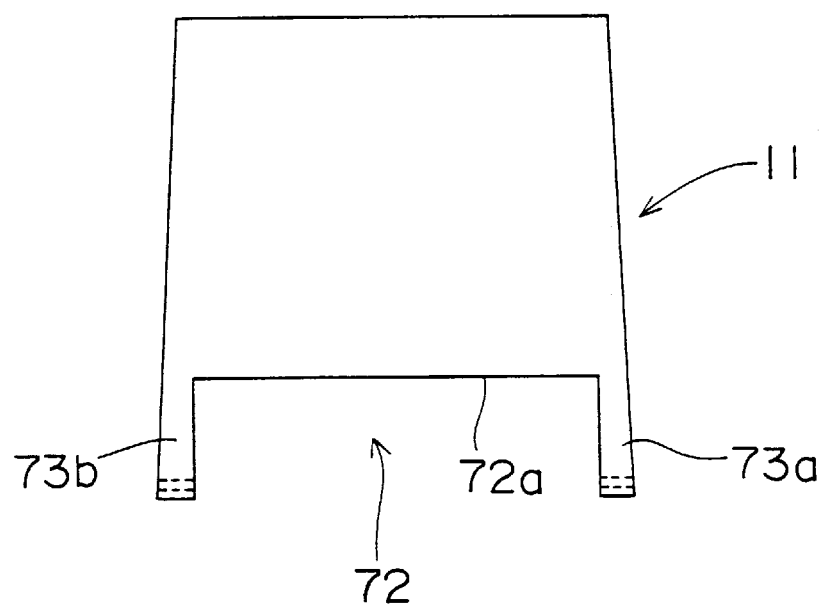
FIG. 12 is a plan view for explaining the shape and the construction of still another example of the original receiving tray.

FIG. 12 is a plan view for explaining the shape and the construction of the original receiving tray 11. FIG. 13 is a partially sectional view showing the vicinity of an original discharge port 10 as viewed from the front, which illustrates the construction thereof for explaining the positional relationship between the original discharge port 10 and the original receiving tray 11.

A rectangular notch 72 functioning as a paper passing section which allows the passage of paper sheets is formed in a lower part of the original receiving tray 11. The notch 72 is formed, whereby mounting sections 73a and 73b exist on both sides of the notch 72. Lower ends of the mounting sections 73a and 73b are rotatably mounted by a pin 74 provided in the vicinity of a right end of an original set surface 7. The original receiving tray 11 can be displaced to a down state which is brought into a so-called cantilever holding state where it extends obliquely up to the left toward a space above the original set surface 7 (indicated by a solid line in FIG. 13) and an up state where it is almost perpendicularly raised (indicated by a broken line in FIG. 13).

The length of the notch 72 is not less than a length approximately equal to the entire width of the original discharge port 10. The notch 72 is so formed that when the original receiving tray 11 is in the up state, the position of an upper side 72a of the notch 72 is higher than the position of the original discharge port 10 (indicated by a two-dot and dash line), as shown in FIG. 13. Further, the notch 72 is so formed that when the original receiving tray 11 is in the down state, the position of the upper side 72a of the notch 72 is lower than the position of the original discharge port 10, and the leading ends of the originals discharged from the original discharge port 10 do not enter the notch 72.

If the original receiving tray 11 is provided with the notch 72 as described above, there are the following merits.

When the original receiving tray 11 is in the down state as indicated by the solid line in FIG. 13, the originals discharged from the original discharge port 10 are guided to the original receiving tray 11, and are discharged onto the original receiving tray 11. On the other hand, when the original receiving tray 11 is in the up state as indicated by the broken line in FIG. 13, the originals discharged from the original discharge port 10 are discharged onto an original set surface 7 after passing through the notch 72 formed in the original receiving tray 11.

Even if in setting originals of the largest size which can be set on the original set surface 7, for example, originals of JIS A3 size, a user brings the original receiving tray 11 into the up state and then, forgets to return the original receiving tray 11 to the down state so that copying is started with the original receiving tray 11 maintained in the up state, therefore, the discharged originals do not collide with the original receiving tray 11. Accordingly, the originals are not jammed and damaged. Consequently, a copying operation need not be inhibited in order to prevent the originals from colliding with the original receiving tray 11. Further, no sensor for sensing the state of the original receiving tray 11 is required, whereby the automatic document feeder 1 can be constructed at low cost.

In place of the notch 72 in the original receiving tray 11, an opening 75 may be provided in a predetermined position of the original receiving tray 11, as shown in FIG. 14. However, the opening 75 is so formed as to allow the passage of the discharged originals only when the original receiving tray 11 is in the up state.

Although the original receiving tray 11 is manually brought into the up state and the down state, it may be connected to a driving mechanism including a motor, a gear and the like and automatically driven to the up state and the down state depending on the operating conditions of the automatic document feeder 11. At this time, even if there occurs such a malfunction that the original receiving tray 11 is not changed from the up state to the down state when the originals are discharged, for example, the originals are discharged without being jammed and damaged.

When the original receiving tray 11 is used, therefore, the discharged originals do not collide with the tray 11 even if the tray 11 is in the up state. Accordingly, the originals are not jammed and damaged. When the tray is in the up state, therefore, a paper conveying operation need not be inhibited. Further, no sensor for sensing the up or down state of the tray 11 is required, whereby the automatic document feeder 1 can be constructed at low cost.

Figure 15:
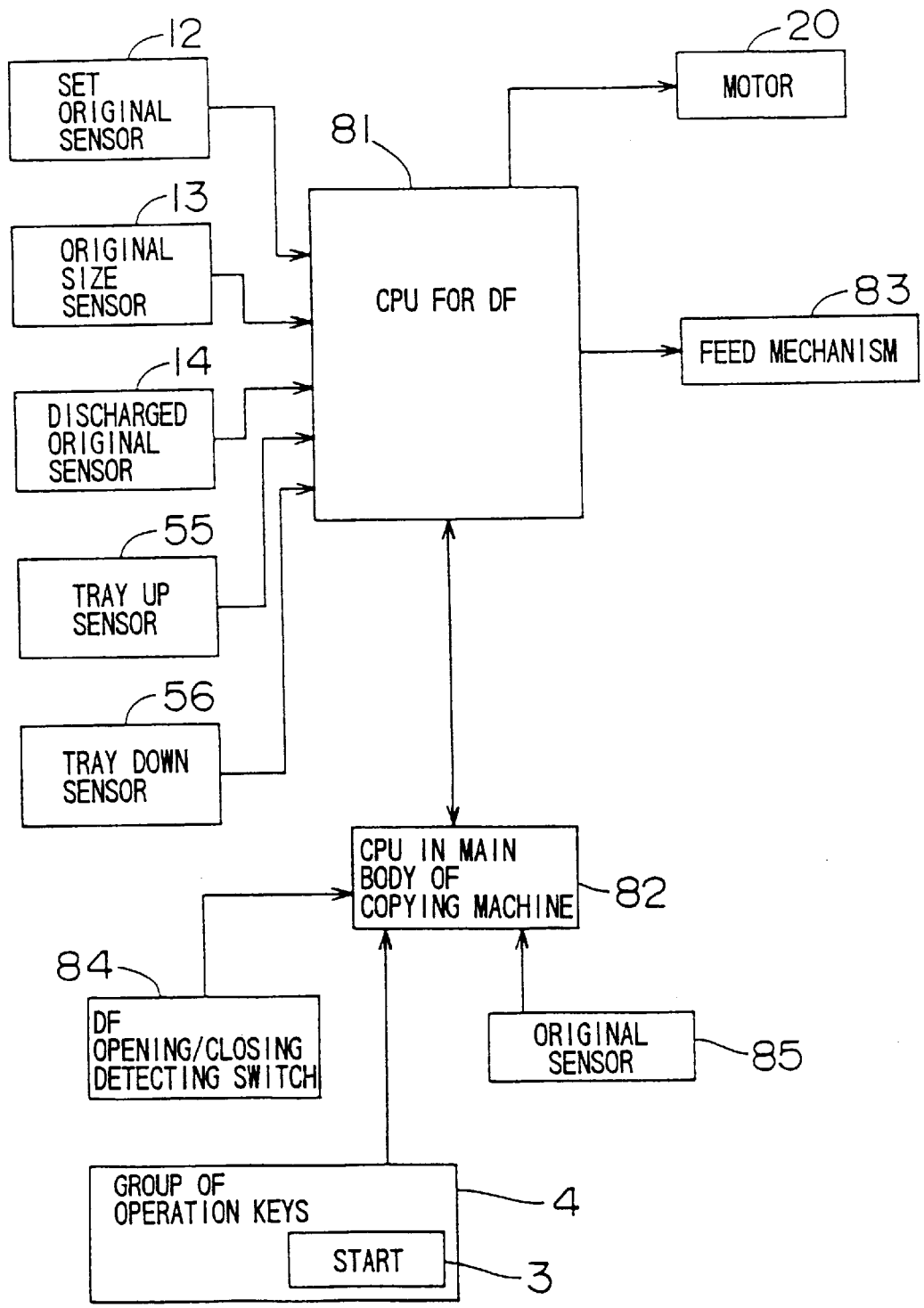
FIG. 15 is a block diagram showing a control circuit in the automatic document feeder according to one embodiment of the present invention.

FIG. 15 is a block diagram showing a control circuit in the automatic document feeder 1 according to the present embodiment, which also illustrates the relationship with a control section in the main body 2 of the copying machine.

Referring to FIG. 15, the automatic document feeder 1 comprises a CPU for DF 81 serving as the center of driving control. Outputs from the set original sensor 12, the original size sensor 13, the discharged original sensor 14, the tray up sensor 55 and the tray down sensor 56 are fed to the CPU for DF 81. In the CPU for DF 81, the driving of the motor 20 and the original feed mechanism 83 are controlled on the basis of the signals from the respective sensors, a control instruction from a CPU 82 in the main body of the copying machine, and the like.

The above-mentioned CPU 82 in the main body of the copying machine is connected to the CPU for DF 81. A signal from a DF opening/closing detecting switch 84 for detecting whether the automatic document feeder 1 is opened (in cases such as a case where it is opened in order to manually set the originals on the original glass plate 15) or closed, a signal from an original sensor 85 for sensing whether or not there are originals left on the original glass plate 15 in the main body 1 of the copying machine, and a signal from the group of operation keys 4 including the copy start key 3 are fed to the CPU 82 in the main body of the copying machine. The CPU 82 in the main body of the copying machine controls the driving of the main body 2 of the copying machine, and gives data, an instruction and the like required to drive the automatic document feeder 1 to the CPU for DF 81 on the basis of the signals. A control signal and the like of the CPU for DF 81 are fed to the CPU 82 in the main body of the copying machine, and are utilized for controlling the main body 2 of the copying machine.

Figure 16:
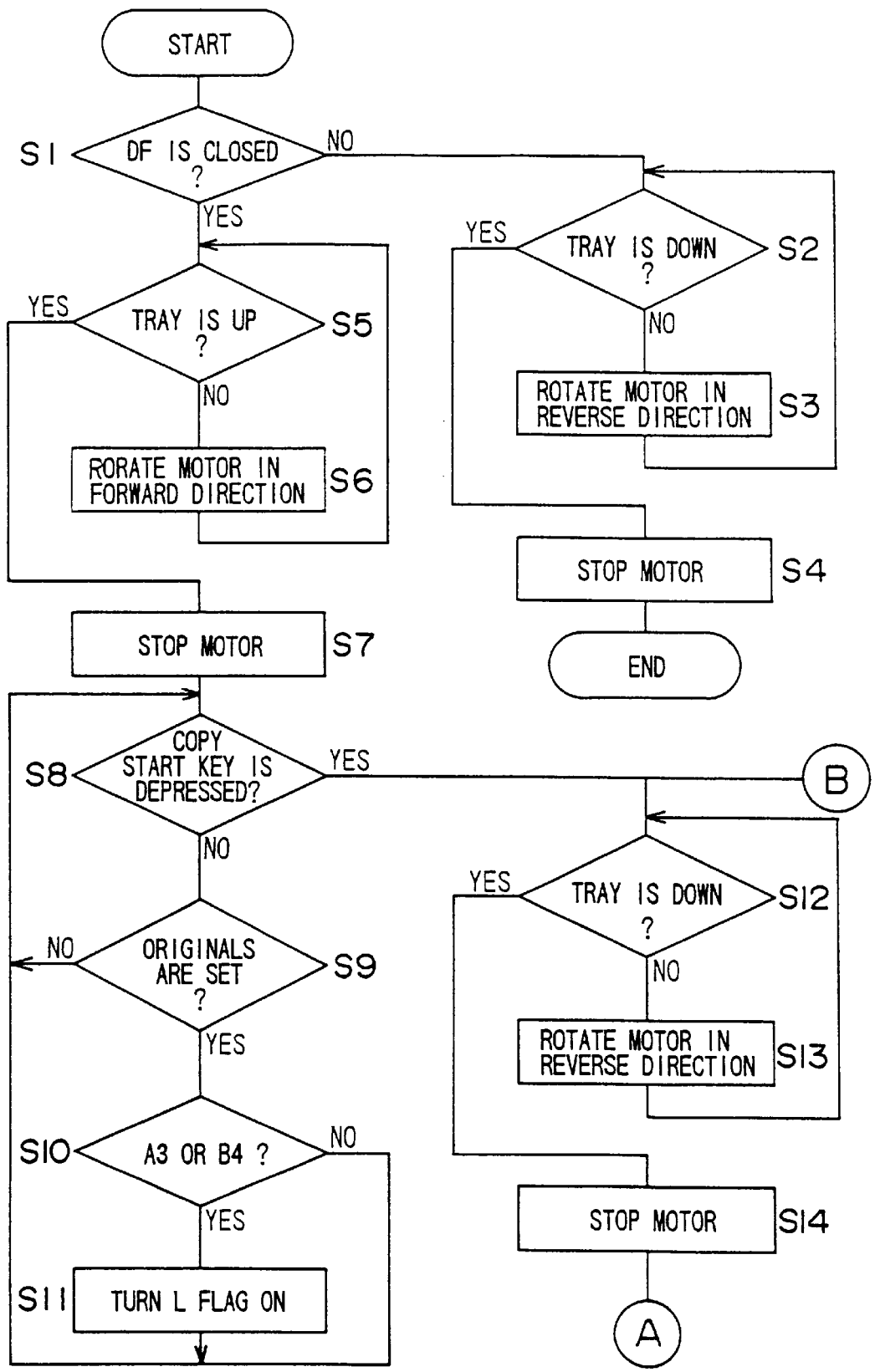
FIG. 16 is a flow chart showing control operations of the automatic document feeder according to one embodiment of the present invention.
Figure 17:
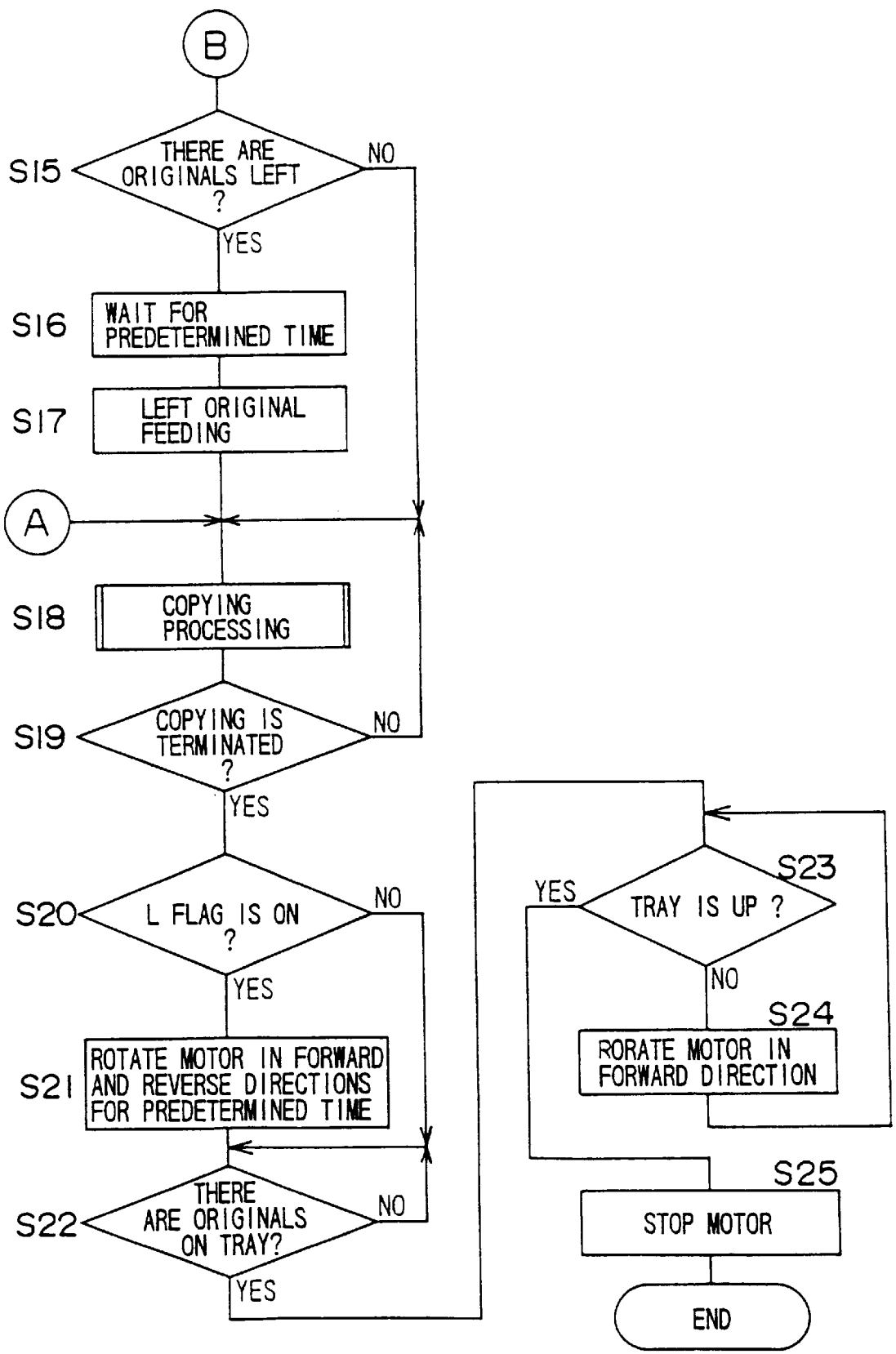
FIG. 17 is a flow chart showing control operations of the automatic document feeder according to one embodiment of the present invention.
Figure 18:
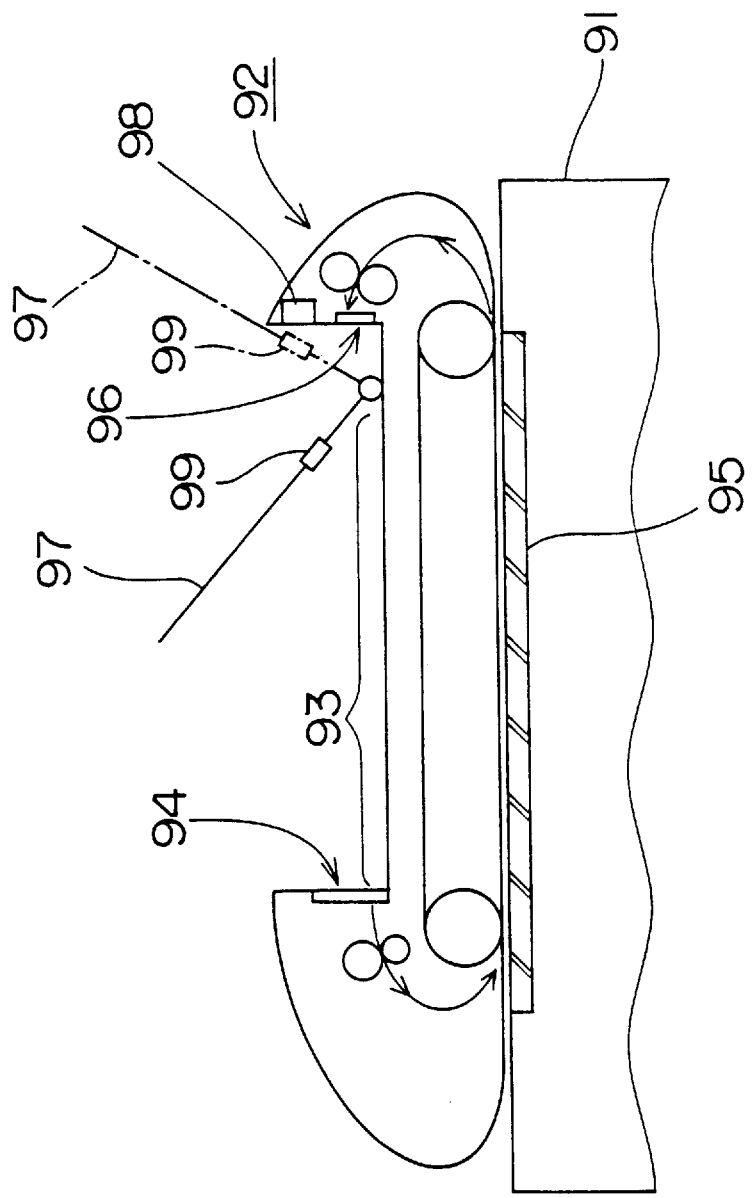
FIG. 18 is a schematic view showing one example of a conventional automatic document feeder for a copying machine.

FIGS. 16 and 17 are flow charts showing control operations of the automatic document feeder 1.

The operations of the automatic document feeder 1 will be described in relation to the operations of the main body 2 of the copying machine in accordance with the flow of FIGS. 16 and 17 while also referring to the other drawings.

When control is started, it is first judged whether or not the automatic document feeder 1 is opened (step S1). This judgment is made depending on whether the DF opening/closing detecting switch 84 is turned on or off. When it is judged that the automatic document feeder 1 is opened, it is judged whether or not the original receiving tray 11 is in the down state (step S2). This judgment is made on the basis of outputs of the tray up sensor 55 and the tray down sensor 56. If the original receiving tray 11 is not in the down state, that is, the original receiving tray 11 is in the up state, the motor 20 is rotated in the reverse direction (step S3), whereby the original receiving tray 11 is brought into the down state. If the original receiving tray 11 enters the down state, the motor 20 is stopped (step S4).

Consider a case where the original receiving tray 11 is thus brought into the down state when it is judged that the automatic document feeder 1 is opened. In this case, even when the original receiving tray 11 is not folded, the original receiving tray 11 does not collide with the wall or the like behind the main body 2 of the copying machine. Specifically, in a case where the original receiving tray 11 is in the up state as shown in FIG. 3, when the automatic document feeder 1 is opened, the upper part of the original receiving tray 11 is much projected toward the space behind the main body 2 of the copying machine.

If the original receiving tray 11 is brought into the down state, however, the amount of projection of the original receiving tray 11 toward the space behind the main body 2 of the copying machine is decreased even when the automatic document feeder 1 is opened, thereby to make it possible to prevent the original receiving tray 11 from colliding with the wall or the like behind the main body 2 of the copying machine.

On the other hand, when it is judged in the step S1 that the automatic document feeder 1 is closed, it is then judged whether or not the original receiving tray 11 is in the up state (step S5). If the original receiving tray 11 is not in the up state, the motor 20 is rotated in the forward direction (step S6). Consequently, the original receiving tray 11 is brought into the up state, whereby the motor 20 is stopped (step S7).

It is then judged whether or not the copy start key 3 provided in the main body 2 of the copying machine is depressed (step S8). When the originals are conveyed using the automatic document feeder 1, and the originals are copied, the copy start key 3 has not been depressed yet at this time point. When the copies are manually made, the copy start key may, in some cases, be depressed at this time point.

When it is judged in step S8 that the copy start key is not depressed, it is further judged whether or not the originals are set on the original set surface 7 (step S9). This judgment is made by the presence or absence of an output of the set original sensor 12.

When it is judged that the originals are set on the original set surface 7, the size of the originals is further judged (step S10). This judgment is made depending on the presence or absence of an output from the original size sensor 13. In the present embodiment, when the size of the originals set on the original set surface 7 is JIS A3 size or JIS B4 size, an L flag indicating that the size of the originals is large is turned on (step S11). When the size of the originals set on the original set surface 7 is A4 size or B5 size, the L flag is not turned on.

The flag is realized by a work register or the like in the CPU for DF 81.

After the originals are set on the original set surface 7, the copy start key 3 is then depressed. Therefore, processing proceeds to step S12 from step S8.

In step S12, it is judged whether or not the original receiving tray 11 is in the down state. This judgment is made on the basis of outputs of the tray up sensor 55 and the tray down sensor 56. Since the original receiving tray 11 is brought into the up state in steps S5, S6 and S7, the original receiving tray 11 is generally in the up state at this time point. Therefore, the motor 20 is rotated in the reverse direction (step S13). Consequently, the original receiving tray 11 is brought into the down state, whereby the motor 20 is stopped (step S14).

In cases such as a case where the user manually brings the original receiving tray 11 into the down state, the motor reverse rotation processing in step S13 is omitted.

Processing in steps S15 to S18 is performed in parallel with the processing in steps S12 to S14.

Specifically, it is judged in step S15 whether or not there are originals left on the original glass plate 15 in the main body 2 of the copying machine. This judgment is made by the presence or absence of an output of the original sensor 85 provided in the main body 2 of the copying machine.

When there are originals left, the automatic document feeder 1 waits for a predetermined time (step S16), after which left original feeding processing is performed (step S17). The left original feeding processing is to feed the left originals by the automatic document feeder 1 and discharge the originals to the original receiving tray 11 from the original discharge port 10.

As described in the foregoing, the processing in steps S15 to S18 is performed in parallel with the processing in steps S12 to S14. In a case where there are originals left, therefore, when the left original feeding processing is immediately performed, there is a possibility that the left originals are discharged from the original discharge port 10 immediately before the original receiving tray 11 is brought into the down state. In order to eliminate the possibility, the automatic document feeder 1 waits for a predetermined time in step S16.

In place of such processing, when there are originals left, the left original feeding processing may be performed at low speed so that the original receiving tray 11 is reliably brought into the down state during the processing.

When there are no originals left, the processing in steps S16 and S17 is omitted.

Copying processing is then performed in step S18. In the copying processing, the originals set on the original set surface 7 are taken in one at a time from the original inlet port 9 and are set on the original glass plate 15, and the main body 2 of the copying machine reads the contents of the originals and copies the originals. The copied originals whose contents are read are discharged to the original receiving tray 11 from the original discharge port 10.

All the originals set on the original set surface 7 will be copied. In the present embodiment, it is judged whether or not the copying processing is terminated on the basis of an output of the set original sensor 12 for sensing originals on the original set surface 7 (step S19).

When the copying processing is terminated, it is judged whether or not the L flag is turned on (step S20). When the L flag is turned on, the originals discharged to the original receiving tray 11 are originals of relatively large size, whereby the motor 20 is repeatedly rotated in the forward and reverse directions for a predetermined time in order to line up the rear ends of the originals of large size. Consequently, the original receiving tray 11 in the down state is swung up and down. Therefore, the originals discharged onto the original receiving tray 11 slip downward along the original receiving tray 11, so that the rear ends of the discharged originals are completely lined up.

When the original receiving tray 11 is swung, to line up on the set surface 7 the rear ends of the originals on the original receiving tray 11, the originals are not erroneously sensed by the discharged original sensor 14.

In the present embodiment, only when the L flag is turned on, that is, only when the originals discharged to the original receiving tray 11 are originals of relatively large size, that is, JIS A3 size or JIS B4 size, processing in step S21 is performed.

However, the processing in step S21 may be performed irrespective of the original size.

In the present embodiment, the processing in step S21, that is, the processing for swinging the original receiving tray 11 up and down is performed when the copying is terminated. Every time one original is discharged during the copying processing, however, the original receiving tray 11 may be swung up and down upon driving the forward rotation and the reverse rotation of the motor 20.

After the copying is terminated, the originals on the original receiving tray 11 are removed. It is judged on the basis of an output of the discharged original sensor 14 whether or not there are originals left on the original receiving tray 11 (step S22). When it is judged that there are no originals left on the original receiving tray 11, it is further judged whether or not the original receiving tray 11 is in the up state (step S23). If the original receiving tray 11 is not manually moved, the original receiving tray 11 is in the down state, whereby the motor 20 is rotated in the forward direction (step S24). When the original receiving tray 11 enters the up state, the motor 20 is stopped (step S25).

Consequently, the automatic document feeder 1 is returned to the copying waiting state where the original receiving tray 11 is in the up state.

In the above-mentioned control operations, it is judged in each of steps S2, S5, S12 and S23 whether the original receiving tray 11 is in the up state or the down state, and the motor 20 is rotated in the forward or reverse direction by the result, to bring the original receiving tray 11 into a desired state.

In place of such control, however, the motor 20 may be rotated in the forward or reverse direction only for a predetermined time without judging the up state or the down state of the original receiving tray 11 so that the original receiving tray 11 enters a desired state, that is, the down state in steps S2 to S4, the up state in steps S5 to S7, the down state in steps S12 to S14, and the up state in steps S23 to S25. Even if the motor 20 is rotated in the forward or reverse direction without judging whether the original receiving tray 11 is in the up state or the down state, torque produced by the motor 20 is applied to the original receiving tray 11 through the above-mentioned slip driving mechanism 22 (see FIG. 6). Even if the motor 20 is further rotated in the reverse direction for a predetermined time in a state where the original receiving tray 11 is manually brought into the down state in the control in the steps S2 to S4, for example, therefore, the motor 20 is only idled by the slip driving mechanism 22, which presents no problem.

It is thus possible to carry out control which does not use outputs of the tray up sensor 55 and the tray down sensor 56. In this case, the tray up sensor 55 and the tray down sensor 56 can be omitted, whereby the control operations are simplified.

Furthermore, in a case where the original receiving tray 11 is brought into the down state, the angle in the down state of the original receiving tray 11 may be changed depending on the size of the discharged originals by providing a plurality of tray down sensors 56, for example, to make it possible to sense the angle in the down state of the original receiving tray 11 or controlling the rotation of the motor 20 (for example, controlling the angle of rotation or the number of revolutions by a pulse motor or a stepping motor), to make it possible to adjust the angle in the down state of the original receiving tray 11.

Specifically, when the size of the discharged originals is relatively small, it is preferable that the original receiving tray 11 is brought into a down state where its tilt angle is small. On the other hand, when the size of the discharged originals is relatively large, it is preferable that the original receiving tray 11 is brought into a down state where its tilt angle is large. Therefore, the tilt angle in the down state of the original receiving tray 11 may be changed depending on the size of the discharged originals.

While referring to FIG. 2 again, in the above-mentioned embodiment, description was made of an example in which there to is provided a discharged original sensor 14 dedicated to sense the presence or absence of originals on the original receiving tray 11.

However, the sensor 14 may be omitted so that the original size sensor 13, for example, can sense not only the size of the originals on the original set surface 7 but also the presence or absence of originals on the original receiving tray 11.

In this case, a hole or the like through which a sensing signal of the sensor 13 passes may be provided in the original receiving tray 11 so that the presence or absence of originals on the original receiving tray 11 is sensed by the sensor 13. In this case, the sensor 13 can be used as an original size sensor and a discharged original sensor by varying the timing at which the signal of the sensor 13 is read by the CPU for DF 81.

In addition to the foregoing, the construction of the present invention can be subjected to various changes as required.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An automatic paper feeder comprising:

a set surface on which paper sheets to be conveyed are to be set;

conveying means having an inlet port and a discharge port which are provided so as to be opposite to each other while being separated by the set surface on both sides of the set surface for taking in the paper sheets set on the set surface from the inlet port, conveying the paper sheets on a predetermined path, and discharging the paper sheets toward the set surface from the discharge port;

a tray having one end mounted in a vicinity of the discharge port for receiving the paper sheets discharged from the discharge port; and tray driving means for rotating said tray to a predetermined state around the one end in accordance with operating conditions of the automatic paper feeder.

2. The automatic paper feeder according to claim 1, wherein the tray driving means displaces the tray to a down state where an end opposite to the one end thereof extends obliquely toward a space above the set surface to receive the paper sheets discharged from the discharge port so as to guide the paper sheets obliquely upward, and an up state where it rises almost perpendicularly upward from the one end or in a direction opposite to the space above the set surface.

3. The automatic paper feeder according to claim 2, wherein the tray driving means brings the tray into the up state in a state where the automatic paper feeder waits until the paper sheets are set on the set surface, while bringing the tray into the down state when the conveying means conveys the paper sheets.

4. The automatic paper feeder according to claim 3, wherein the tray driving means swings the tray in response to termination of the discharge of the paper sheets on the set surface to the tray.

5. The automatic paper feeder according to claim 2, further comprising
- means for sensing whether or not there are paper sheets which are previously used left on a predetermined path on which the conveying means conveys the paper sheets before the conveyance of the paper sheets set on the set surface is started, and
- controlling means for displacing the tray toward the down state by the tray driving means in response to sensing of the left paper sheets by the sensing means and driving the conveying means so that the left paper sheets are discharged from the discharge port after the tray is displaced to a position where it can receive the paper sheets discharged from the discharge port.

6. The automatic paper feeder according to claim 2, wherein said automatic paper feeder can be changed to a closed state where it is mounted on an image processing apparatus so that it can convey the paper sheets, and an opened state where it is partly separated from the image processing apparatus, and further comprising:
- opening detecting means for detecting, when the automatic paper feeder is changed from the closed state to the opened state,
- the tray driving means bringing the tray into the down state in response to an output of the opening detecting means.

7. The automatic paper feeder according to claim 1, wherein
- the tray driving means has a motor serving as a driving source, further comprising
- means for nullifying transmission of a force between the motor and the tray when a difference in load of not less than a predetermined value occurs between the motor and the tray.

8. The automatic paper feeder according to claim 7, wherein
- said nullifying means comprises
- a slip mechanism to which a driving force from the motor is applied, and
- a driving shaft connected to the slip mechanism and the tray.

9. The automatic paper feeder according to claim 2, wherein
- the tray is divided into at least a main tray forming a portion on the side of the one end supported and a sub tray forming a portion on the side of the other end, the sub tray being foldable with respect to the main tray.

10. The automatic paper feeder according to claim 9, wherein
- the main tray and the sub tray are connected to each other by a supporting shaft extending in a direction perpendicular to a main surface of each of the trays, the sub tray being foldable toward a state where the main surface of the sub tray is overlapped with the main surface of the main tray around the supporting shaft and a state where they are not overlapped with each other.

11. The automatic paper feeder according to claim 10, wherein
- an elastic member for always urging the sub tray to the state where the main surface of the sub tray is not overlapped with the main surface of the main tray is further provided between the main tray and the sub tray.

12. The automatic paper feeder according to claim 9, wherein
- an upper side of the main tray and a lower side of the sub tray are rotatably connected to each other by a hinge pin.

13. The automatic paper feeder according to claim 12, wherein
- an elastic member for urging the sub tray so that the sub tray enters a state where it is almost straight with respect to the main tray is provided in relation to the hinge pin.

14. The automatic paper feeder according to claim 1, further comprising
- a paper sensor arranged in relation to the set surface for sensing a presence or absence of paper sheets arranged on the tray on the side of the set surface.

15. The automatic paper feeder according to claim 14, wherein
- a detecting window through which a sensing signal from the paper sensor is to be passed is formed in the tray.

16. The automatic paper feeder according to claim 15, wherein
- the paper sensor also senses whether or not a size of the paper sheets set on the set surface is not less than a predetermined size, and senses the presence or absence of paper sheets on the tray through the detecting window formed in the tray when there are no paper sheets on the set surface.

17. The automatic paper feeder according to claim 2, wherein
- a paper passing section which allows passage of the paper sheets discharged from the discharge port is formed in a predetermined position of the tray so that the paper sheets are discharged to the set surface when the tray is in the up state.

* * * * *